United States Patent [19]

Yamamoto et al.

[11] Patent Number: 5,219,411
[45] Date of Patent: Jun. 15, 1993

[54] ADAPTIVE ENGINE OUTPUT MODE SETTING METHOD BASED ON SHOE SLIP

[75] Inventors: Shigeru Yamamoto, Osaka; Hideki Yamada, Kyoto, both of Japan

[73] Assignee: Kabushiki Kaisha Komatsu Seisakusho, Tokyo, Japan

[21] Appl. No.: 457,782

[22] PCT Filed: May 16, 1989

[86] PCT No.: PCT/JP89/00495

§ 371 Date: Mar. 16, 1990

§ 102(e) Date: Mar. 16, 1990

[87] PCT Pub. No.: WO89/11590

PCT Pub. Date: Nov. 30, 1989

[30] Foreign Application Priority Data

May 16, 1988 [JP] Japan .................. 63-118932
May 27, 1988 [JP] Japan .................. 63-131181

[51] Int. Cl.5 .................. B60K 28/16; B60L 3/10; E02F 9/20
[52] U.S. Cl. .................. 180/197; 364/424.07; 364/431.12
[58] Field of Search .................. 180/9.7, 6.7, 9.1, 197; 364/424.07, 424.01, 424.02, 424.03, 424.1; 364/431.01, 431.04, 431.12

[56] References Cited

U.S. PATENT DOCUMENTS 4,282,933 8/1981 Suganami et al. .
4,630,685 12/1986 Huck, Jr. et al. .............. 364/424.07
4,986,377 1/1991 Moriarty .................. 180/6.7
5,012,418 4/1991 Petzold, Rainer .............. 364/431.01

FOREIGN PATENT DOCUMENTS 56-115430 2/1980 Japan .
6224580 9/1980 Japan .
58-123932 1/1982 Japan .
627942 7/1985 Japan .

OTHER PUBLICATIONS

WO 89/02520, Abstract, Title: Shoe Slip Control Method and Apparatus Therefor for Caterpillar® Vehicle—Date: Mar. 23, 1989.

*Primary Examiner*—Mitchell J. Hill
*Attorney, Agent, or Firm*—Armstrong, Westerman, Hattori, McLeland & Naughton

[57] ABSTRACT

The present invention relates to a method for controlling a power output of an engine of a crawler vehicle; such as, large sized bulldozers, at a time when shoe slip of such crawler vehicle occurs in operation, the crawler vehicle being provided with working equipments; such as, dozing units or blades, ripping units or rippers or the like. More particularly, the present invention relates to an adaptive engine power output mode setting method for automatically keeping the engine of the crawler vehicle in an optimum power output condition according to rates of the shoe slip or shoe slip rates of the crawler vehicle.

6 Claims, 14 Drawing Sheets

FIG.10

| GEAR SHIFTING / OPERATION | | WORK | |
|---|---|---|---|
| | | RIPPING | DOZING |
| FORWARD SPEED | 1 FIRST SPEED | B | A |
| | 2 SECOND SPEED | C | |
| | 3 THIRD SPEED | | |
| REVERSE SPEED | 1 FIRST SPEED | D | |
| | 2 SECOND SPEED | | |
| | 3 THIRD SPEED | | |

FIG.11

| GEAR SHIFTING / OPERATION | | WORK | |
|---|---|---|---|
| | | RIPPING | DOZING |
| FORWARD SPEED | 1 FIRST SPEED | B | A |
| | 2 SECOND SPEED | C | |
| | 3 THIRD SPEED | | |
| REVERSE SPEED | 1 FIRST SPEED | D | |
| | 2 SECOND SPEED | | |
| | 3 THIRD SPEED | | |

ADAPTIVE ENGINE OUTPUT MODE SETTING METHOD BASED ON SHOE SLIP

FIELD OF THE INVENTION

The present invention relates to a method for controlling a power output of an engine of a crawler vehicle such as large sized bulldozers at a time when shoe slip of such crawler vehicle occurs in operation, the crawler vehicle being provided with working equipments such as dozing units or blades, ripping units or rippers and the like. More particularly, the present invention relates to an adaptive engine power output mode setting method (hereinafter simply referred to as the adaptive engine output mode setting method) for automatically keeping the engine of the crawler vehicle in an optimum power output condition according to rates of the shoe slip or shoe slip rates of the crawler vehicle.

DESCRIPTION OF THE PRIOR ART

In general, during traveling of the crawler vehicles such as bulldozers and the like, power outputs of the engines of the crawler vehicles are transmitted to sprocket wheels of the vehicles through power trains containing torque converters, transmissions, bevel gears, steering clutches, steering brakes and final reduction gears, so that crawlers running round the sprocket wheels of the crawler vehicles are driven by the power outputs of the engines to enable the crawler vehicles to travel. Consequently, drawbar-pulls or tractive forces produced in the crawlers of the vehicles can be calculated from both of the power outputs of the engines and total reduction rates of the power trains of the crawler vehicles.

On the other hand, in the crawler vehicles, the power outputs of the engines thereof are manually controlled through main control levers of the vehicles so as to be set on predetermined values. The power outputs of the engines thus controlled through the main control levers are reduced by depressing deceleration pedals of the crawler vehicles. When the deceleration pedals having been depressed are released from external depressing forces exerted by an operator of the vehicle, the predetermined values of the power outputs of the engines are recovered.

Drawbar-pulls of tractive forces of the crawler vehicles in traveling depend on slip rates of shoes of crawlers of the vehicles on the ground, the slip rates of the shoes being hereinafter simply referred to as the shoe slip rates. Until the shoe slip rates of the vehicles reach predetermined critical values, the drawbar-pulls or tractive forces of the vehicles increase as the shoe slip rates increase. However, when the shoe slip rates exceed the predetermined critical values, the crawlers of the vehicles merely slip on the ground: to cause many disadvantages such as large energy loss and excessive wear of the crawlers; and to make it impossible to effectively utilize the power outputs of the engines for producing sufficient drawbar-pulls or tractive forces.

For example, in bulldozing operation conducted by a blade unit of a bulldozer or in ripping operation conducted by a ripper unit of the bulldozer, when the bulldozer is subjected to an excessive load to cause a shoe slip, such shoe slip is recognized by an operator of the bulldozer. After that, the operator depresses a deceleration pedal of the bulldozer to lower a power output of an engine of the bulldozer, and simultaneously he operates the bulldozer's working equipment such as the blade unit and the ripper unit so as to reduce the load, through which the drawbar-pull or tractive force of the bulldozer is lowered. The above operator's cumbersome manual operation for resolving disadvantages resulted from the shoe slip requires a high degree of skill.

Namely, in control operation of the shoe slip conducted through the operator's manual operation, the operator must depress the deceleration pedal after he recognizes the shoe slip, and simultaneously he must operate the working equipment of the bulldozer. Consequently, such operator's manual operation is very cumbersome, and requires extreme caution. In addition, in actual operation of the bulldozer, the power output of the engine is manually lowered by the operator after he recognizes the shoe slip having occurred. Consequently, it is impossible for the operator to prevent the shoe slip from occurring. In other words, in actual operation of the bulldozer, the shoe slip continues for a certain period of time without exceptions. In addition, some operators intentionally cause the crawler shoes of the bulldozer to excessively slip on the ground. Therefore, under such circumstances, it is very difficult to prevent the shoe slip from occurring in operation of the bulldozer. Furthermore, hitherto, after the shoe slip having occurred in operation of the bulldozer is removed, the deceleration pedal of the bulldozer must be released from an external depressing force exerted by the operator, so as to return to its initial pedal position in which the deceleration pedal permits the working power output of the engine to be recovered.

Japanese Patent Laid-Open No. 60-245859 discloses a technique for obtaining engine power outputs corresponding to working conditions of vehicles without depending on operator's recognition and decision. In this technique, a governor control lever of a vehicle is automatically switched over in correspondence with loads to which a drive system of the vehicle is subjected, so that cumbersomeness in operator's manual operation is resolved and the vehicle is improved in its fuel consumption.

In the conventional technique disclosed in the above Japanese Patent Laid-Open No. 60-245859, rotational speeds of the drive system of the vehicle are detected, analyzed and calculated to offer results on the basis of which the governor control lever of the vehicle is switched over stepwise. Consequently, in the above conventional technique, it is impossible to continuously change the power output of the engine of the vehicle. In addition, the technique lacks measures to return the operation of the engine back to its working power output condition.

On the other hand, as another conventional technique, Japanese Patent Publication No. 58-49661 discloses an apparatus for controlling the shoe slip of the vehicle. This another conventional technique employs: a Doppler-type speed detecting means for detecting a traveling speed of a vehicle; a shoe slip rate detecting means for detecting a shoe slip rate of the vehicle on the basis of both of the traveling speed of the vehicle detected by the Doppler-type speed detecting means and a rotational speed of a sprocket wheel detected in a sprocket-wheel drive mechanism of the vehicle; and a means for issuing a signal at a time when the shoe slip rate having been detected exceeds a predetermined value, the signal being used to reduce a load of the working equipment of the vehicle.

In the above Doppler-type speed detecting means, a microwave is issued to the ground and reflected therefrom to produce a reflected wave which is received to determine an actual velocity or traveling speed of the vehicle relative to the ground. Consequently, in case that the Doppler-type speed detecting means is used on the water or a rough ground to conduct a speed detecting operation, such detecting operation is poor in accuracy and too slow in response speed. In addition to the above, the Doppler-type speed detecting means often malfunctions in case that there are a plurality of sensors in the vicinity of the speed detecting means. Furthermore, the Doppler-type speed detecting means suffers from its relatively high cost because the speed detecting means requires expensive auxiliary units such as space filters, laser oscillators and the like.

In addition, in operation of the working equipment of the vehicle employing the technique disclosed in the above Japanese Patent Publication No. 58-49661, an engine of the vehicle must produce an excessive power output exceeding a normal power output depending on a normal shoe slip rate of the vehicle. During such working operation, if a deceleration pedal of the vehicle is not adequately operated, it is not possible for the engine to produce a power output required to perform the working operation of the vehicle at a constant speed. In other words, hitherto, in case that the working equipment of the vehicle is operated, the operator of the vehicle must controls operation of the engine of the vehicle through the deceleration pedal thereof so as to produce a power output required to perform the working operation of the vehicle at a constant speed even when conditions of the ground do not change. Namely, hitherto, manual operations of the deceleration pedal of the vehicle are vehicle's inevitable operations for performing the working operation of the vehicle.

In addition, hitherto, manual operations of the deceleration pedal of the vehicle are also inevitable in order to keep a reverse speed of the vehicle at an adequate value, because the reverse speed of the vehicle varies during the working operation such as ripping operations and bulldozing operations of the vehicle to impair characteristics of the vehicle in ridability and in safety when the vehicle is not provided with a suitable control means for controlling the reverse speed of the vehicle on the basis of engine power output modes in forward-speed controlling operations which depend on the shoe slip rates of the vehicle.

SUMMARY OF THE INVENTION

Under such circumstances, the present invention was made. It is a first object of the present invention to provide a method for controlling operation of an engine of a vehicle so as to increase or decrease a power output of the engine on the basis of at least one of measured values of factors such as inadequate shoe slip rates, inadequate traveling speeds and inadequate drawbar-pulls or tractive forces, which factors are obtained through measurements of theoretical traveling speeds, actual traveling speeds and engine speeds, whereby the engine of the vehicle is operated in optimum conditions in efficiency to produce a power output required to perform a working operation of the vehicle at an adequate speed. In other words, according to the present invention, there is provided an adaptive engine power output mode setting method in which: the power output of the engine of the vehicle is automatically increased or decreased according to at least one of the measured values of the shoe slip rates, traveling speeds and drawbar-pulls or tractive forces of the vehicle, so as to perform the working operation of the vehicle within a predetermined range of the shoe slip rate of the vehicle, whereby the engine of the vehicle is continuously operated always in its optimum power output conditions on the basis of a relationship between the drawbar-pull or tractive force and the traveling speed of the vehicle, the optimum power output conditions of operation of the engine being hereinafter referred to as the adaptive engine output mode.

It is a second object of the present invention to provide the adaptive engine output mode setting method in which: in accordance with at least one of measured values of the shoe slip rates, traveling speeds and the drawbar-pulls or tractive forces, and in accordance with the presence or absence of the working operation of the vehicle, operation of the engine of the vehicle is automatically controlled to increase or decrease a power output of the engine so that operation of engine remains in a drive condition within a predetermined shoe slip rate of the vehicle to produce a power output required to perform the working operation of the vehicle without any fear that a speed of the working operation is lowered and without employing a deceleration pedal of the vehicle.

It is a third object of the present invention to provide a method for controlling a reverse speed of a vehicle without employing a deceleration pedal of the vehicle, in which method: a maximum speed is set in each of the adaptive engine output modes based on the shoe slip rates of the vehicle, which modes are manually or automatically change over with each other in accordance with conditions of the working operation of the vehicle and operational conditions of a lever.

According to a first embodiment of the present invention, the above first object of the present invention is accomplished by providing:

An adaptive engine power output mode setting method based on shoe slip of a crawler vehicle provided with an engine, for performing an effective working operation of the crawler vehicle, comprising the steps of:

storing in an engine power output control system of the vehicle at least one of preset basic operation modes of the engine, in each of which modes a high power output portion of an engine power output full performance curve shown in a tractive force/traveling speed diagram is cut off beforehand in accordance with conditions of the ground; and selecting an adaptive basic operation mode of the engine out of the preset basic operation modes by operating a dial which is preset in accordance with the conditions of the ground.

According to a second embodiment of the present invention, there is provided:

The adaptive engine power output mode setting method based on the shoe slip of the crawler vehicle as set forth in the first embodiment of the present invention, wherein:

a power output of the engine in each of the basic operation modes is partially cut off to provide an operation control mode of the engine, which control mode is stored in the engine power output control system of the vehicle;

a rate of the shoe slip or shoe slip rate of the vehicle is constantly measured during working operation of the vehicle; and when the shoe slip rate of the vehicle thus measured exceeds a predetermined value, the power output of the engine is partially cut off by gradually shifting an operation mode of the engine from the basic operation mode to the operation control mode thereof until the shoe slip of the vehicle is removed.

According to a third embodiment of the present invention, there is provided:

The adaptive engine power output mode setting method based on the shoe slip of the crawler vehicle as set forth in the second embodiment of the present invention, wherein:

when the shoe slip rate of the vehicle thus measured decreases to a value lower than the predetermined value, the power output of the engine is recovered by gradually shifting the operation mode of the engine from the operation control mode to the basic operation mode thereof.

According to a fourth embodiment of the present invention, there is provided:

The adaptive engine power output mode setting method based on the shoe slip of the crawler vehicle as set forth in the third embodiment of the present invention, wherein:

when the operation mode of the engine is shifted from the basic operation mode to the operation control mode or vice versa, variation of the shoe slip rate of the vehicle from the predetermined value is measured; and, at the same time, variations in traveling speed and tractive force of the vehicle from a predetermined traveling speed and a predetermined tractive force are also measured, which variations of the vehicle in shoe slip rate, traveling speed and tractive force are employed as additional conditions for shifting the operation mode of the engine.

According to a fifth embodiment of the present invention, there is provided:

The adaptive engine power output mode setting method based on the shoe slip of the crawler vehicle as set forth in the first embodiment of the present invention, wherein:

when a rate of the shoe slip or shoe slip rate of the vehicle reaches a predetermined value, a tractive force of the vehicle is stored as a drawbar-pull in the engine power output control system which also provides the basic operation mode of the engine;

the drawbar-pull of the vehicle is multiplied by a plurality of preset drawbar-pull coefficients depending on the conditions of the ground, to produce a plurality of values corresponding to a plurality of power outputs of the engine, which power outputs have been partially cut off in operation control modes of the engine, which operation control modes are stored in the engine power output control system of the vehicle; and the adaptive basic operation mode of the engine is selected out of the preset basic operation modes by operating the dial which is preset in accordance with the conditions of the ground, so that the power output of the engine is partially cut off in the adaptive basic operation mode of the engine until the shoe slip rate of the vehicle reaches the predetermined value.

According to a sixth embodiment of the present invention, there is provided:

An adaptive engine power output mode setting method based on shoe slip of a crawler vehicle provided with an engine, for performing an effective working operation of the crawler vehicle, comprising the steps of:

classifying operation modes of the engine into at least two groups according to conditions of the ground when ripping operations of the vehicle are performed on the ground, in which ripping operations a power output of the engine is set at a predetermined;

classifying operation modes of the engine into a plurality of groups according to the conditions of the ground when bulldozing operations of the vehicle are performed on the ground or operations of the vehicle are performed in reverse on the ground, in which operations a power output of the engine is set at a predetermined value; and presetting the operation modes of the engine with respect of its power output according to a tractive force/traveling speed diagram of the vehicle;

whereby optimum shoe slip rates of the vehicle are automatically obtained during the ripping and bulldozing operations of the crawler vehicle without conducting any additional manual operations of the vehicle.

According to a seventh embodiment of the present invention, there is provided:

The adaptive engine power output mode setting method based on the shoe slip of the crawler vehicle as set forth in the sixth embodiment of the present invention, wherein:

when a gear-shifting lever of a transmission of the vehicle is shifted to a position of a first forward speed, the engine of the vehicle is automatically operated in an operation mode suitable for performing the bulldozing operations of the vehicle according to the tractive force/traveling speed diagram; and when a ripping lever of the vehicle is operated to start the ripping operations of the vehicle in the operation mode suitable for performing the bulldozing operations of the vehicle, operation of the engine is automatically shifted from the operation mode suitable for performing the bulldozing operations of the vehicle to another operation mode suitable for performing the ripping operations of the vehicle.

According to an eighth embodiment of the present invention, there is provided:

The adaptive engine power output mode setting method based on the shoe slip of the crawler vehicle as set forth in the sixth embodiment of the present invention, wherein:

according to the tractive force/traveling speed diagram of the vehicle, the engine is automatically operated in an operation mode suitable for performing the ripping operations of the vehicle when the gear-shifting lever of the transmission of the vehicle is shifted to a position of one of a first, second and a third forward speed and the ripping lever is also operated; and operation of the engine is automatically shifted from the operation mode suitable for performing the ripping operations of the vehicle to another operation mode suitable for performing the bulldozing operations of the vehicle when the ripping lever of the vehicle is not operated in the operation mode suitable for performing the ripping operations of the vehicle within a predetermined period of time after the engine is operated in the operation mode suitable for performing the ripping operations of the vehicle.

According to a ninth embodiment of the present invention, there is provided:

The adaptive engine power output mode setting method based on the shoe slip of the crawler vehicle as set forth in the sixth embodiment of the present invention, wherein:

according to the tractive force/traveling speed diagram of the vehicle, the engine is operated in an operation mode suitable for performing the ripping operations of the vehicle when a ripping lever of the vehicle is operated, while the engine is operated in another operation mode suitable for performing the bulldozing operations of the vehicle when a blade lever of the vehicle is operated; and operation of the engine remains in the operation mode suitable for performing the ripping operations of the vehicle until the blade lever is operated, or remains in the operation mode suitable for performing the bulldozing operations of the vehicle until the ripping lever is operated.

According to a tenth embodiment of the present invention, the above second object of the present invention is accomplished by providing:

An adaptive engine power output mode setting method based on shoe slip of a crawler vehicle provided with an engine and a working equipment, for performing an effective working operation of the crawler vehicle, comprising the steps of:

storing, in an engine power output control system of the vehicle, a plurality of preset engine operation modes comprising: a basic operation mode in which a high output portion of an engine power output full performance curve shown in a tractive force/traveling speed diagram of the vehicle is cut off; an operation control mode in which a power output of the engine is partially cut off to keep a rate of the shoe slip of the vehicle at a predetermined value; and a working-equipment operating mode for increasing a power output of the engine to a predetermined value at a time when operation of the working equipment starts;

operating the engine in the basic operation mode or in the operation control mode when the working equipment is not operated; and operating the engine in the working-equipment operating mode when the working equipment of the vehicle is operated.

In order to accomplish the above third object of the present invention, according to an eleventh embodiment of the present invention, there is provided:

The adaptive engine power output mode setting method based on the shoe slip of the crawler vehicle as set forth in the first embodiment of the present invention, wherein the method further comprising the steps of:

storing in the engine power output control system of the vehicle a plurality of full engine speeds which depend on the conditions of the ground to provide a substantially full power output of the engine, the vehicle being so operated: as to shift a gear-shifting lever of a transmission of the vehicle from a forward speed position to a reverse speed position of the gear-shifting lever when driven in reverse during operation of the working equipment of the vehicle; as to lift the working equipment from the ground; and as to shift an engine speed from that of the adaptive basic operation mode of the engine to one of the full engine speeds providing the substantially full power output of the engine; and setting the engine speed according to conditions of the working operation of the vehicle by means of a reverse-traveling speed setting dial of the vehicle, in which dial the plurality of the full engine speeds are preset.

Advantages inherent in the present invention having the above embodiments are as follows:

(1) The present invention contributes to improvements of the crawler vehicle such as big bulldozers equipped with bulldozing equipments or blade units and ripping equipments or ripper units in fuel consumption and lifetime of an undercarriage of the vehicle, and also contributes to reduction of manual operations of the vehicle conducted by the operator. Particularly, the present invention enables the engine of the crawler vehicle to operate in its optimum operation mode according to conditions of the ground. In addition, the present invention enables the operator of the vehicle to control a power output of the engine as he requires;

(2) In case of emergency, the present invention permits the operator of the vehicle to manually control a power output of the engine, so that the present invention improves operation of vehicle in safety;

(3) The present invention enables the engine of the vehicle to perform an automatic operation of the engine in an operation mode suitable for performing each of working operations of the vehicle without employing any special sensor for performing the automatic operation of the engine; and (4) The present invention enables the engine of the vehicle: to resolve a lack of a power output of the engine during working operations of the vehicle without operating a deceleration pedal of the vehicle; to keep an operation speed of the working equipment of the vehicle constant; to produce a power output to an extent that the operator of the vehicle requires; and to reduce a load of manual operations of the operator.

The above objects, additional objects, additional embodiments and advantages of the present invention will be clarified to those skilled in the art hereinbelow with reference to the following description and accompanying drawings illustrating preferred embodiments of the present invention according to principles of the present invention.

BRIEF DESCRIPTION OF THE DRAWINGS

FIGS. 1 to 4 are drawbar-pull/traveling speed diagrams (hereinafter simply referred to as the tractive force/speed diagram) of the crawler vehicle of a first embodiment of the method of the present invention, in which:

FIG. 1 shows a basic operation mode (hereinafter simply referred to as the basic mode) of the engine of the crawler vehicle;

FIG. 2 shows an operation control mode (hereinafter simply referred to as the control mode) of the engine;

FIG. 3 shows a plurality of concrete examples combining the basic modes and the control modes; and FIG. 4 shows an operation of the engine of the vehicle for temporarily increasing a power output of the engine;

FIGS. 10 and 11 are graphic illustrations of a third embodiment of the method of the present invention, illustrating the relationship between working operations and gear shifting of the crawler vehicle such as the bulldozer;

DESCRIPTION OF THE PREFERRED EMBODIMENTS

Now, a first embodiment of an adaptive engine power output mode setting method (hereinafter simply referred to as the adaptive engine output mode setting method) of the present invention will be hereinbelow described in detail with reference to FIGS. 1 to 4 of the accompanying drawings.

Figure 1:
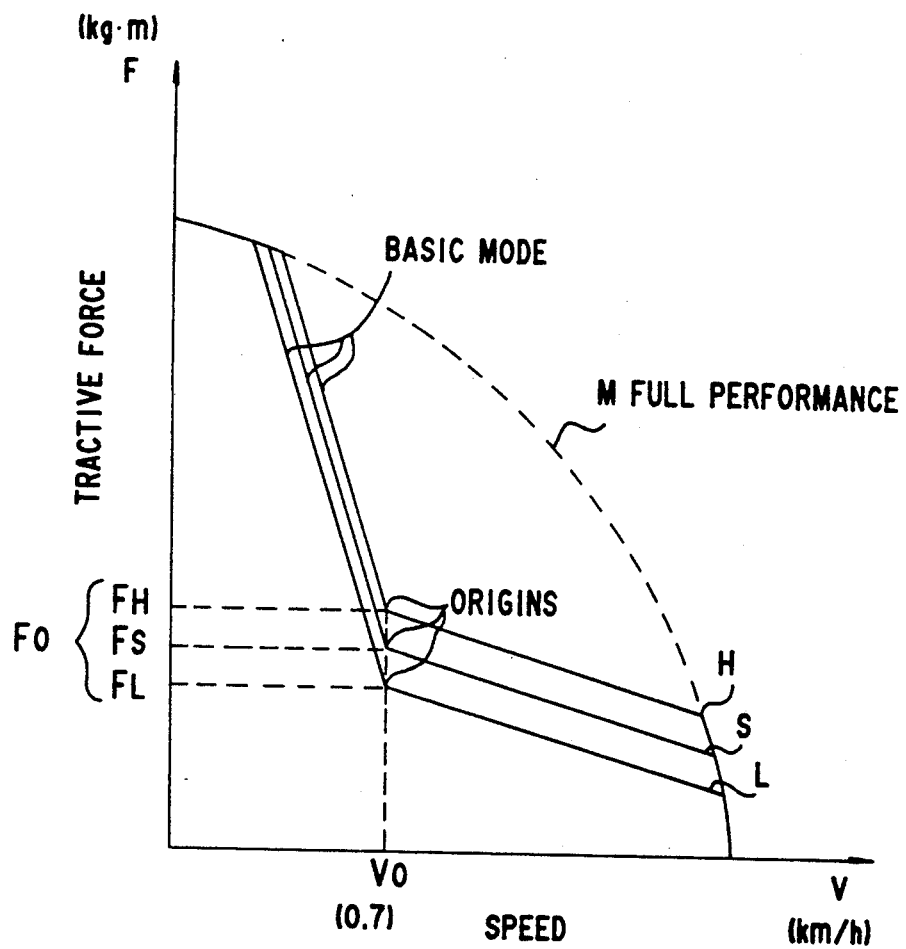

FIG. 1 is a drawbar-pull/traveling speed diagram (hereinafter referred to the tractive force/speed diagram) of a crawler vehicle such as a large sized bulldozer equipped with working equipments such as bulldozing equipments or blade units and ripping equipments or ripper units, which vehicle is operated according to the first embodiment of the adaptive engine output mode setting method of the present invention. As shown in FIG. 1, a full power output performance of an engine of the vehicle is shown by a broken line curve M which intersects with x-axis of the diagram of FIG. 1 at a point representing an upper limit of traveling speed of the vehicle. In addition, the curve M intersects also with y-axis of the diagram of FIG. 1 at a point representing an upper limit of drawbar-pull or tractive force of the vehicle. As already described in the above, the tractive force of the crawler vehicle depends on the shoe slip rate of the vehicle, and reaches its maximum effective value when the shoe slip rate reaches a predetermined value. Taking account of this fact, operations of the engine of the vehicle traveling upon a solid and firm ground are conducted in basic operation modes (hereinafter simply referred to as the basic modes) shown by solid line curves H, S, L. As is clear from FIG. 1, a high power output portion of the curve M is cut off in each of the basic modes H, S, L of operation of the engine. In the diagram shown in FIG. 1: the reference character $V_o$ denotes the origin of traveling speed of the vehicle; and $F_o$ the origin of tractive force of the vehicle. These three types of the basic modes H, S, L can be shifted to each other during operation of the engine of the vehicle by means of a dial mounted on a control panel of the vehicle.

In case that the engine of the crawler vehicle such as a bulldozer is operated in the basic mode H to enable the vehicle to perform ripping work on the ground in forward speed, the above predetermined value of the shoe slip rate enabling the tractive force of the vehicle to reach its maximum effective value is set at a value of 30% under conditions where the origin $F'_o$ of the tractive force or a steady working tractive force $F_o$ of the vehicle is 50 tons and the origin $V_o$ of the traveling speed or a steady working speed $V_o$ of the vehicle is 0.7 Km/h.

Figure 2:
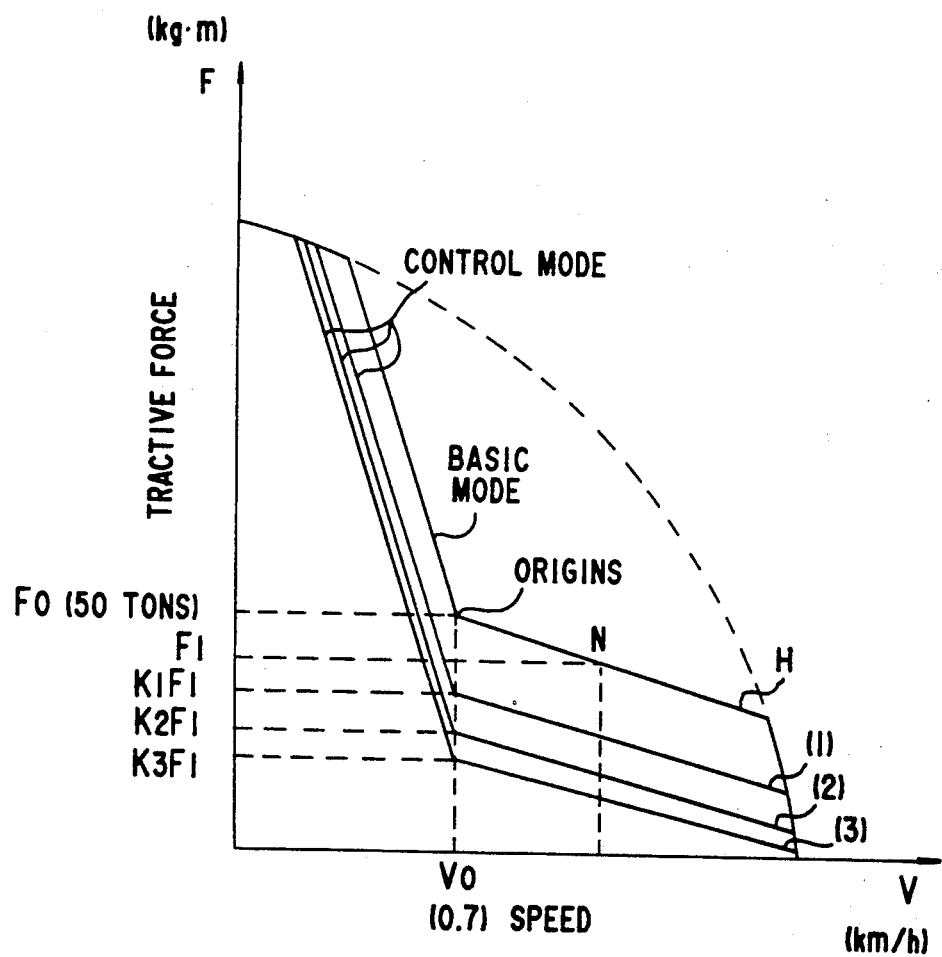

The above conditions are realized in the basic mode H in a tractive force/speed diagram shown in FIG. 2, in which diagram the shoe slip rate of the vehicle is set at a value of 30% to enable the vehicle to keep its working operation steady, whereby the vehicle produces its maximum effective tractive force. This basic mode H is a target mode of working operation of the vehicle or a target mode of operation of the engine of the vehicle.

In case that the vehicle performs its working operation at a point N of the basic mode H shown in the tractive force/speed diagram of FIG. 2, when the shoe slip rate of the vehicle exceeds the above predetermined value of 30% due to a variation in condition of the ground so that a shoe slip detecting trigger signal is issued to a basic control system of the vehicle, a value of a tractive force of the vehicle under such circumstances is stored as a drawbar-pull $F_1$ in the basic control system of the vehicle. a power output of the engine enabling the vehicle to produce the drawbar-pull $F_1$ is then partially cut off by a predetermined amount hereinafter described in detail, whereby the excessive shoe slip of the vehicle is removed.

When the excessive shoe slip of the vehicle is removed under conditions where a cut-off rate of the power output of the engine of the vehicle is set in a range of, for example such as from 20 to 40%, it is possible to set a drawbar-pull coefficient K at values ranging from 0.8 to 0.6 or ranging from 0.7 to 0.5. The coefficient K may be independent of the basic modes H, S, L which is set by the dial. It is also possible for the coefficient K to vary according to the basic modes H, S and L so as to be $K_1$, $K_2$ and $K_3$, respectively. It is also possible to employ a single basic mode and dials H, S, L through which the coefficient K is varied.

In the diagram shown in FIG. 2: a curve (1) denotes a control mode of operation of the engine when the drawbar-pull coefficient $K_1$ is set at a value of 0.8; a curve (2) denotes a control mode operation of the engine when the drawbar-pull coefficient $K_2$ is set at a value of 0.6; and a curve (3) denotes a control mode operation of the engine when the drawbar-pull coefficient $K_3$ is set at a value of 0.5.

Figure 3:
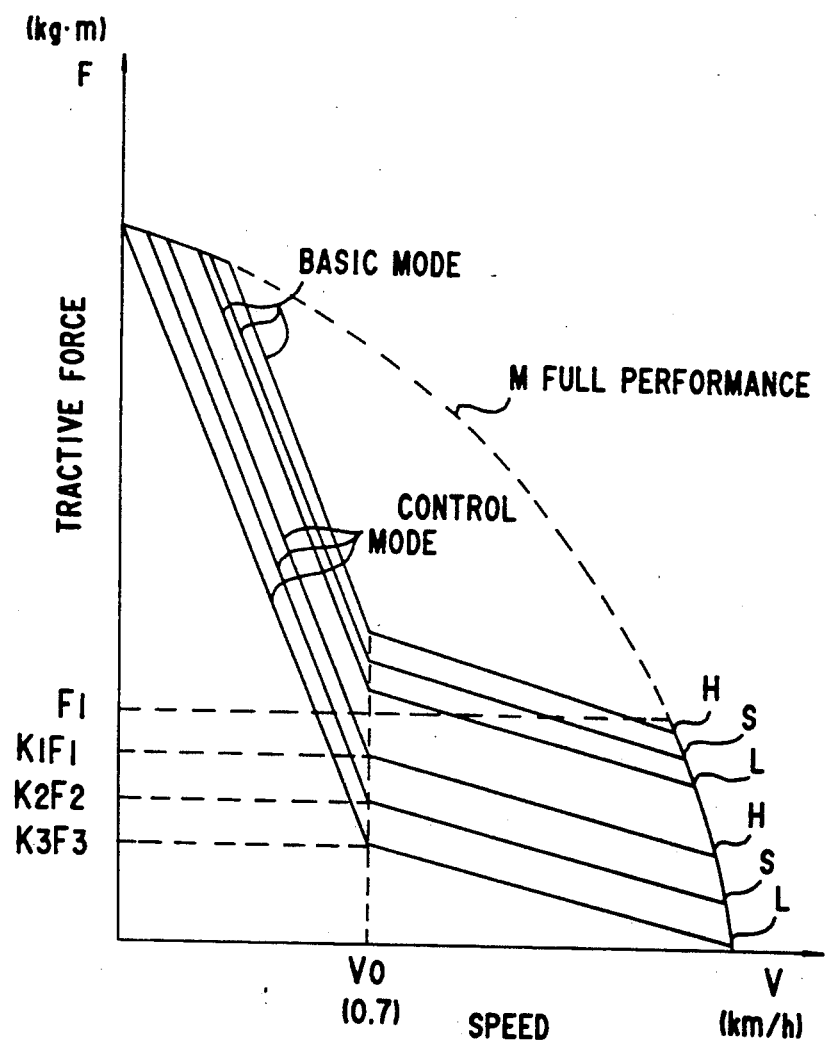

FIG. 3 is a tractive force/speed diagram of the vehicle, in which diagram three types of basic modes are provided for the dials H, S, L. When the dial H is employed under conditions where the shoe slip detecting trigger signal is issued at a time when the vehicle produces a tractive force $F_1$, the drawbar-pull coefficient $K_1$ is applied to the basic mode. Under the same conditions as those of the above: when the dial S is employed, the drawbar-pull coefficient $K_2$ is applied to the basic mode; and when the dial L is employed, the drawbar-pull coefficient $K_3$ is applied to the basic mode.

It is possible for the drawbar-pull coefficient to take a plurality of stages spaced apart from each other at intervals of, for example, 0.1. However, in order to improve working operation of the vehicle in easiness and in reliability, it is preferable for the drawbar-pull coefficient to take three stages.

In working operation of the vehicle on the same site, conditions of the ground often varies. Consequently, under such circumstances, it is often necessary for the engine of the vehicle to vary its power output instantly. However, when a power output of the engine is partially cut off according to the above drawbar-pull coefficient at the same time when conditions of the ground varies to cause the engine to vary its power output, there is a fear that a transient lack of power output of the engine occurs in working operation of the vehicle or that the operator of the vehicle is forced to conduct excessive manual operations of the vehicle to cover the lack of the power output of the engine in the working operation of the vehicle.

Figure 4:
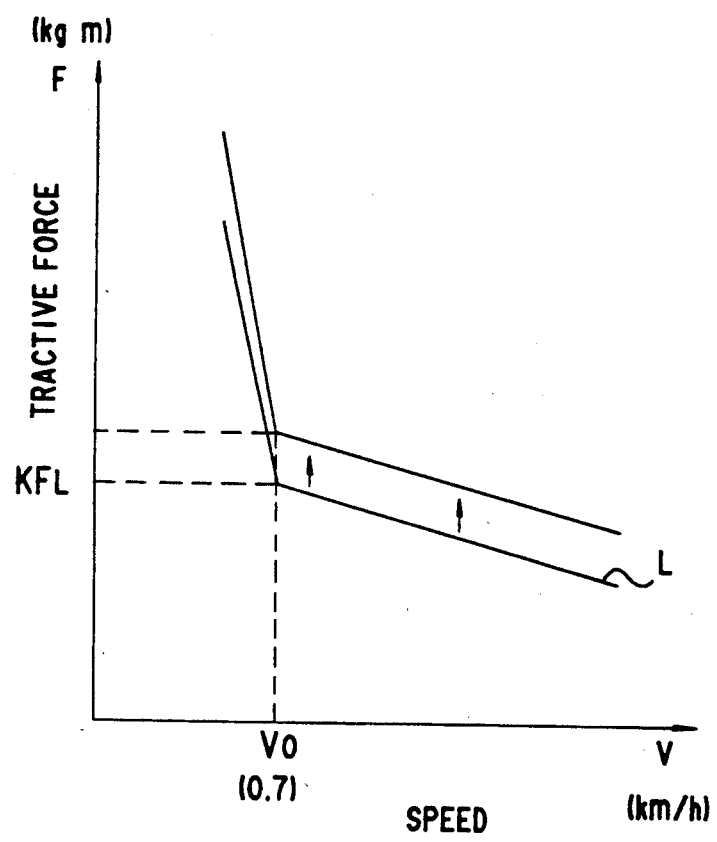

In order to prevent such transient lack of the power output of the engine from occurring, according to the present invention, a power output of the engine of the vehicle is temporarily increase in the working operation of the vehicle operated with an adaptive shoe slip rate. Namely, as shown in FIG. 4, when operation of the engine is performed in the basic mode L in which a drawbar-pull coefficient is set at a value of, for example, 0.6 and working operation of the vehicle lacks steadiness due to instant variation of the ground conditions, a power output of the engine is temporarily increased to meet such instant variation of the ground conditions. After working operation of the vehicle returns to its steady condition, operation of the engine is shifted back to the above basic mode L.

An engine power output setting dial is provided in a control panel of an operator's room of the vehicle. By means of the power output setting dial, operation of the engine is shifted from one operation mode to another operation mode, which operation mode of the engine is is based on setting of the drawbar-pull coefficient. In addition, a switch for temporarily increasing a power output of the engine is mounted on a top end of a grip portion of a ripping-operation lever which is provided in the operator's room of the vehicle, so that the switch can be operated together with the ripping-operation lever.

Now, a second embodiment of the method of the present invention will be described with reference to FIGS. 5 to 9 of the accompanying drawings.

Figure 5:
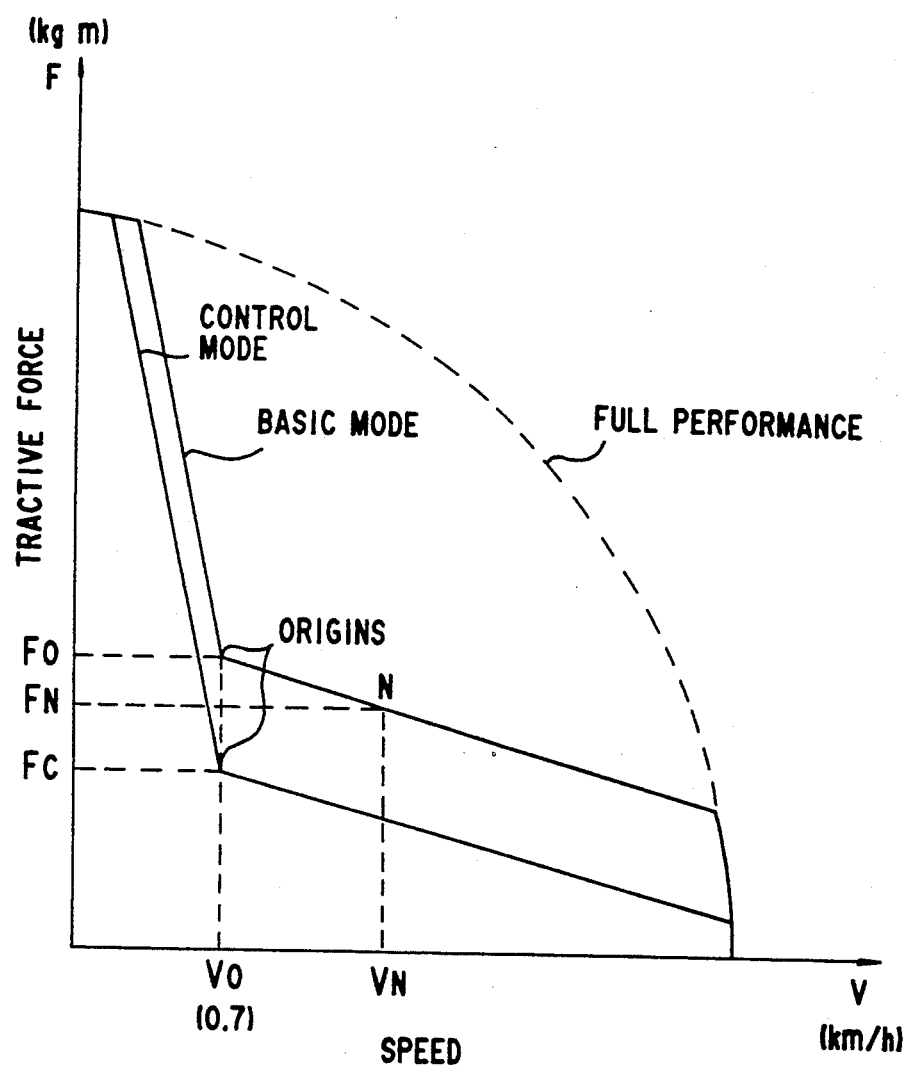
FIG. 5 is a tractive force/speed diagram of the vehicle of a second embodiment of the method of the present invention.

Incidentally, in FIG. 5, the parts which are the same as ones shown in FIG. 1 have been given the same reference characters and are not further described to avoid redundancy in description.

In case that operation of the engine of the vehicle is conducted at a point N of the basic mode shown in FIG. 5 and the shoe slip rate of the vehicle exceeds the above predetermined value due to variation of conditions of the ground to cause the shoe slip detecting trigger signal to be issued, a value of a tractive force $F_N$ of the vehicle under such circumstances is stored in the engine power output control system of the present invention. Then, a power output of the engine having been operated in the above basic mode is partially cut off to remove the excessive shoe slip exceeding the above predetermined value, so that a new basic mode of operation of the engine is so established as to employ a tractive force $F_c$ of the vehicle as the origin of a tractive force of the new basic mode, the tractive force $F_c$ being produced by the vehicle when the engine produces a power output causing the shoes of the vehicle to slip at a rate of the above predetermined value or predetermined shoe slip rate.

Figure 6:
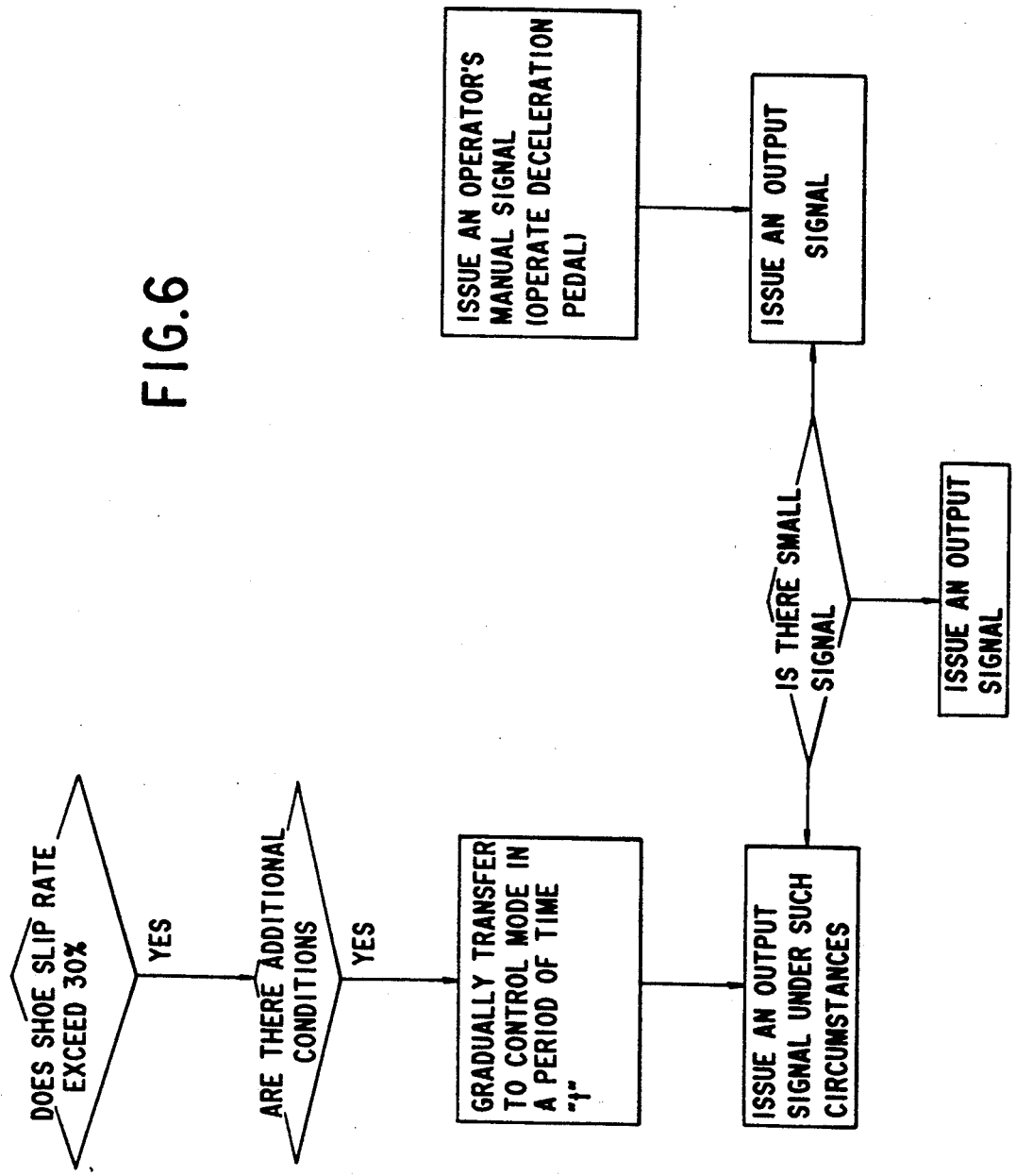
FIG. 6 is a flowchart illustrating all related processing steps required to shift operation of the engine of the vehicle from the basic mode to the control mode.
Figure 7:
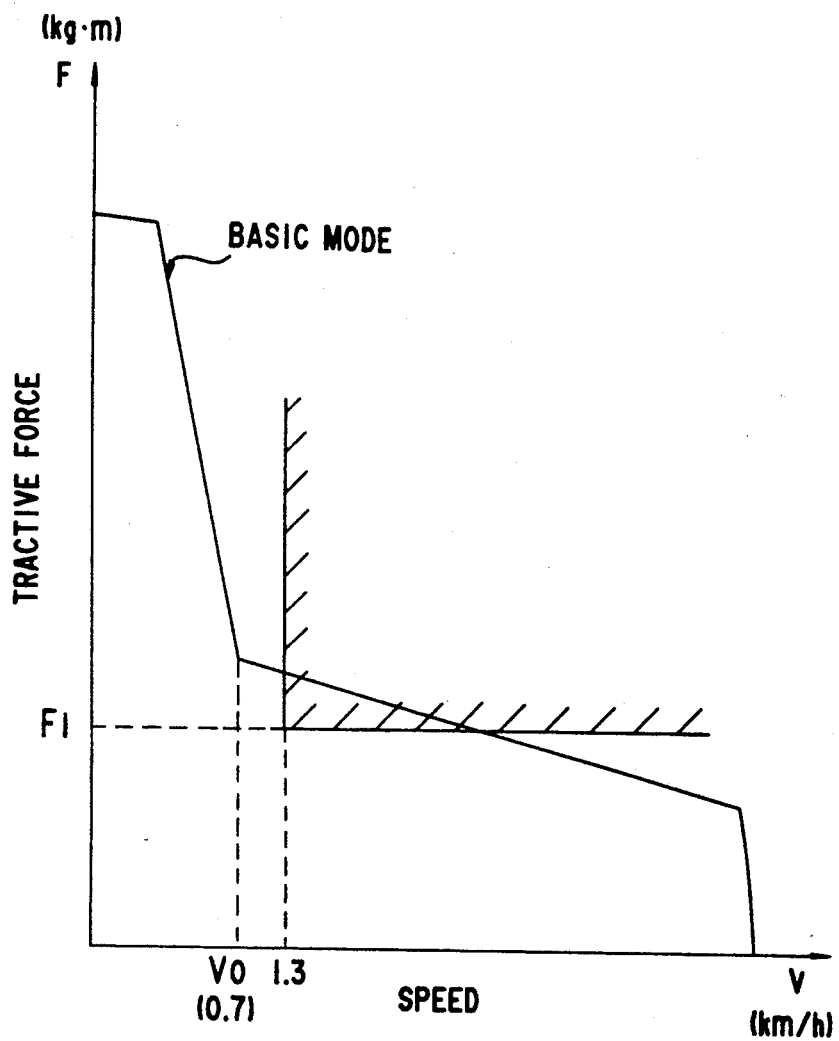
FIG. 7 is a tractive force/speed diagram similar to the diagram shown in FIG. 2, illustrating conditions of operation of the engine required for shifting of its operation modes.
Figure 8:
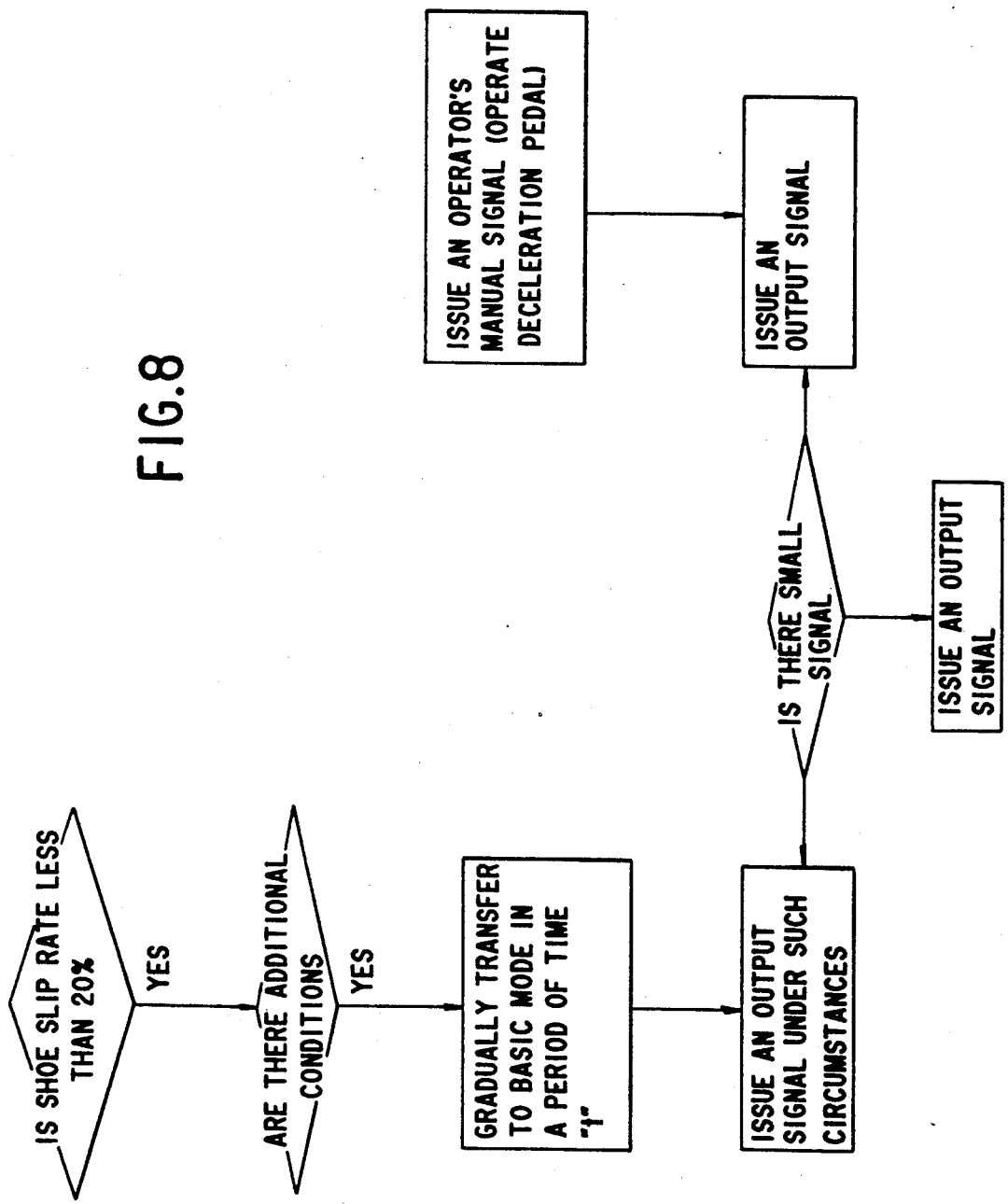
FIG. 8 is a flowchart illustrating all related processing steps required to shift operation of the engine back to the basic mode from the control mode.
Figure 9:
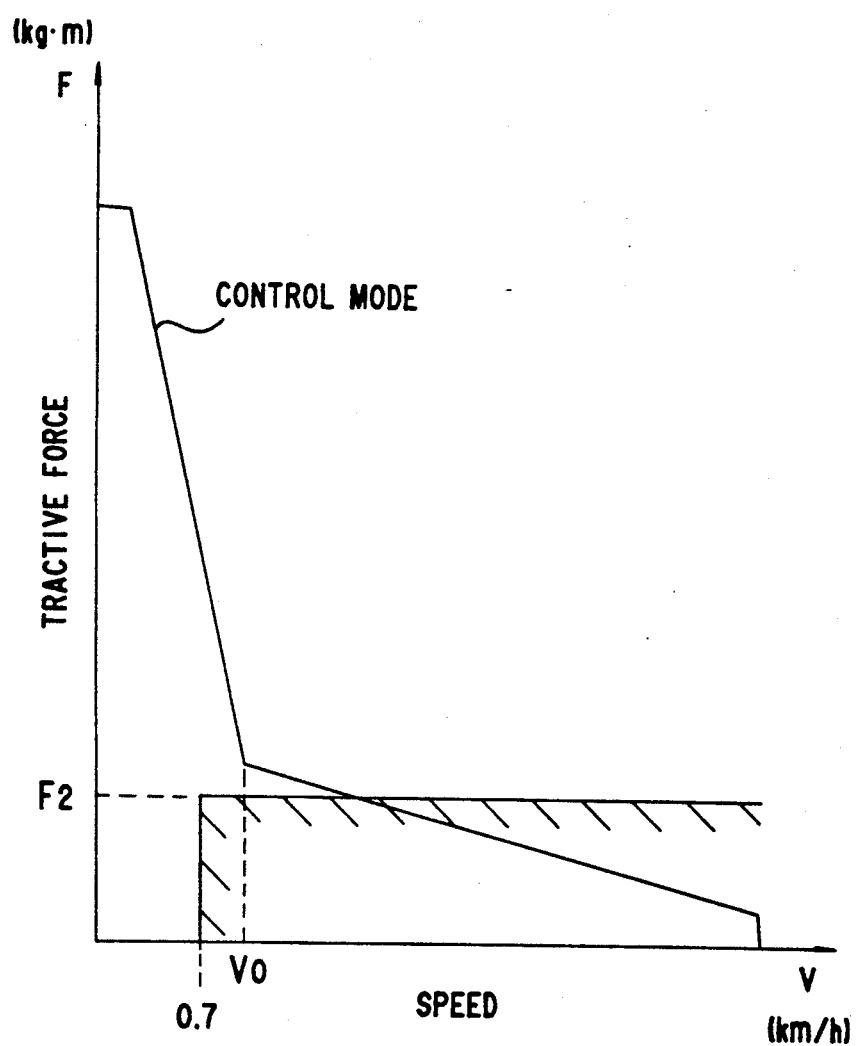
FIG. 9 is a tractive force/speed diagram similar to the diagram shown in FIG. 8, illustrating conditions of operation of the engine required for shifting of its operation modes.

As shown in FIG. 5, after the basic mode (in which the engine so drives the shoes of the vehicle as to slip on the ground at the predetermined shoe slip rate) and the control mode (in which a power output of the engine is partially cut off to remove the excessive shoe slip) are provided for operation of the engine, the engine of the vehicle is sequentially operated according to flowcharts shown in FIGS. 6 and 8. Namely, operation of the engine of the vehicle is controlled by the engine power output control system which carries out all required procedures described in the above flowcharts shown in FIGS. 6 and 8.

As is clear from the flowchart shown in FIG. 6, when the shoe slip rate of the vehicle exceeds the predetermined value of 30%, or after additional conditions shown in the flowchart of FIG. 6 are detected at a time when the shoe slip rate of the vehicle exceeds the predetermined value of 30%, operation of the engine is gradually shifted from the basic mode to the control mode within a predetermined period t of time, for example such as a period of time ranging from 0 to 3 seconds. The above-mentioned additional conditions shown in the flowchart of FIG. 6 are conditions where: the speed of the vehicle exceeds a point $V_o$ (corresponding to 1.0 Km/h in this case) on X-axis of a tractive force/speed diagram shown in FIG. 7 so as to be a speed exceeding 1.3 Km/h; and a tractive force of the vehicle exceeds a point $F_1$ on Y-axis of the diagram shown in FIG. 7.

Thus, in case that the shoe slip rate of the vehicle exceeds the predetermined value of 30%, operation of the engine is shifted from the basic mode to the control mode so that the power output of the engine is partially cut off to remove the excessive shoe slip of the vehicle. After that, operation of the engine is shifted back to the basic mode from the control mode. In this shifting-back operation, as shown in the flowchart of FIG. 8, when the shoe slip rate of the vehicle is excessively lowered to be a value of, for example, less than 20%, or after additional conditions shown in the flowchart of FIG. 8 are detected at a time when the shoe slip rate of the vehicle is lower than 20%, operation of the engine is gradually shifted back to the basic mode from the control mode within a predetermined period t of time, for example such as a period of time ranging from 0 to 3 seconds. The above-mentioned additional conditions shown in the flowchart of FIG. 8 are conditions where: a speed of the vehicle is lower than a point $V_o$ on X-axis of a tractive force/speed diagram shown in FIG. 9 to reach a speed lower than 0.7 Km/h; and a tractive force of the vehicle ranges up to a point $F_2$ on Y-axis of the diagram shown in FIG. 9.

As described above, according to the present invention, operation of the engine of the vehicle is automatically shifted smoothly from the basic mode to the control mode or shifted back to the basic mode from the control mode smoothly. In addition, as is clear from the flowcharts shown in FIGS. 6 and 8, the method of the present invention permits the operator of the vehicle to manually operate a main control lever or a deceleration pedal through which a power output of the engine is manually controlled. Consequently, in case of emergency, it is possible for the operator of the vehicle to manually control such lever or pedal, whereby working operation of the vehicle is improved in safety and in adaptability.

Now, a third embodiment of the method of the present invention will be described with reference to FIGS. 5, 10 and 11.

Operations of the engine is classified into four modes A, B, C, D. In the mode A, a bulldozing operation is performed by the vehicle. In the mode B, a ripping operation is performed by the vehicle traveling at a first forward speed. In the mode C, another ripping operation is performed by the vehicle traveling at a second speed or traveling at a third speed. And, in the mode D, the vehicle travels at a reverse speed.

The mode A is an operation mode of the engine, which mode consists of the basic mode shown in the tractive force/speed diagram of FIG. 5.

The mode B is an operation mode of the engine, which mode consists of the basic mode and the control mode shown in the tractive force/speed diagram of FIG. 5. In this mode B: operation of the engine is performed in the basic mode when the shoe slip rate of the vehicle provides the maximum effective tractive force of the vehicle; when the shoe slip rate of the vehicle exceeds the predetermined value, operation of the engine is performed in the control mode in which a power output of the engine is partially cut off to remove the excessive shoe slip rate; and, after the shoe slip rate of the vehicle returns to the predetermined value, operation of the engine is shifted back to the basic mode from the control mode.

The mode C is an operation mode of the engine, which mode is manually controlled by the operator of the vehicle through the main control lever. When the deceleration pedal and an acceleration pedal of the vehicle is manually operated by the operator of the vehicle, such manual operations conducted by the operator are applied first of all to the engine of the vehicle so that the engine is operated in an operation mode depending on such manual operations.

The mode D is an operation mode of the engine, in which mode a power output of the engine is partially cut off to lower the reverse speed of the vehicle relative to the forward speeds of the vehicle.

As shown in FIGS. 10 and 11, in conditions where the main control lever or gear shifting lever of the vehicle is operated to place the gears of the transmission of the vehicle in any one of a first, second and a third forward speed position, when one of working operation levers such as the ripping operation lever and the bulldozing operation lever of the vehicle is selected and operated, operation of the engine is performed in an operation mode corresponding to the thus selected working operation of the vehicle until another working operation lever is operated.

In addition, as is clear from FIGS. 10 and 11, in conditions where the gear shifting lever of the vehicle is operated to place the gears of the transmission of the vehicle in any one of a first, second and a third reverse speed position, when one of working operation levers such as the ripping operation lever and the bulldozing operation lever of the vehicle is selected and operated, operation of the engine is performed in an operation mode corresponding to the thus selected working operation of the vehicle until another working operation lever is operated, whereby it is possible for the engine operated in the above operation mode to produce a power output particularly adaptable to the thus selected working operation of the vehicle.

Now, a fourth embodiment of the method of the present invention will be described in detail with reference to FIGS. 12 and 13.

Figure 12:
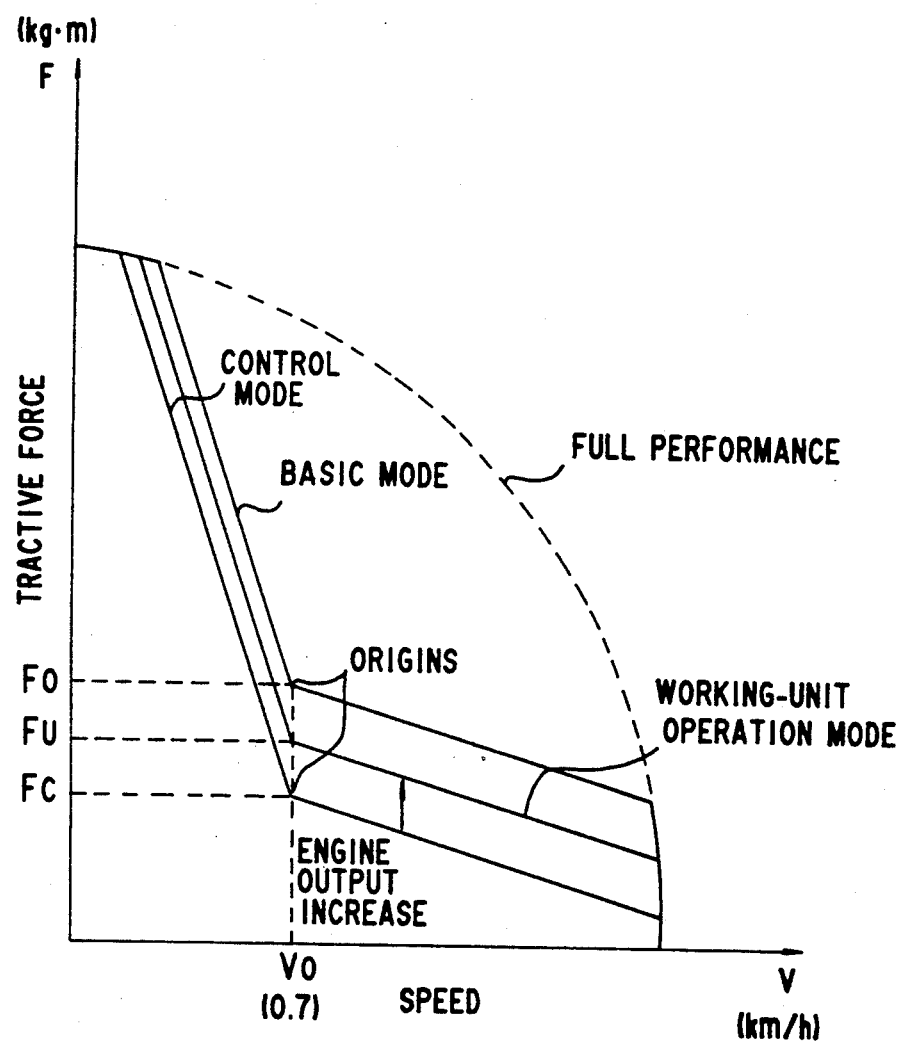
FIG. 12 is a tractive force/speed diagram of the vehicle, illustrating operation of the engine according to a fourth embodiment of the method of the present invention.

Incidentally, in FIG. 12, the parts which are the same as ones shown in FIG. 5 have been given the same reference characters and are not further described to avoid redundancy in description.

For example, as for the ripping operation of the vehicle for ripping the ground, pavements and the like a bulldozing operation of which is difficult, operation of the engine is performed in a basic mode shown in a tractive force/speed diagram of FIG. 12 or a control modes shown in the same diagram, so that the ripping operation of the vehicle is performed. In case that the ripping operation of the vehicle is performed in conditions where operation of the engine is performed in the control mode shown in FIG. 12, when the ripping operation lever is operated to actuate the ripping equipment or ripper of the vehicle, there is a fear that a power output of the engine lacks or a fear that an operational speed of the ripping operation of the vehicle is decreased. In order to remove the above fear, the ripping operation lever is interlocked with the acceleration pedal of the vehicle to enable the engine to increase or decrease its power output in synchronism with operation of the ripping operation lever, whereby it is possible for the engine to produce a sufficient amount of power output enabling the working equipment or unit of the vehicle to perform a necessary working operation in a so-called working-unit operation mode thereof. As shown in FIG. 12, the working-unit operation mode is obtained by multiplying the control mode of operation of the engine by a predetermined coefficient. Consequently, in the tractive force/speed diagram shown in FIG. 12, for example, a tractive force $F_u$ of the vehicle is obtained by multiplying the origin $F_c$ of the control mode by the predetermined coefficient, and constitutes the origin $F_u$ of the working-unit operation mode in which operation of the engine is performed. The above predetermined coefficient for obtaining the working-unit operation mode is set at: a value of 0.6 when the ripper of the vehicle is driven downward; at a value of 0.6 when the ripper is tilted back; at a value of 0.8 when the ripper is lifted; and at a value of 1.0 when the ripper is tilted.

In addition, in case that the engine of the vehicle is operated in the basic mode, it is also possible to vary the above values of the predetermined coefficient.

Figure 13:
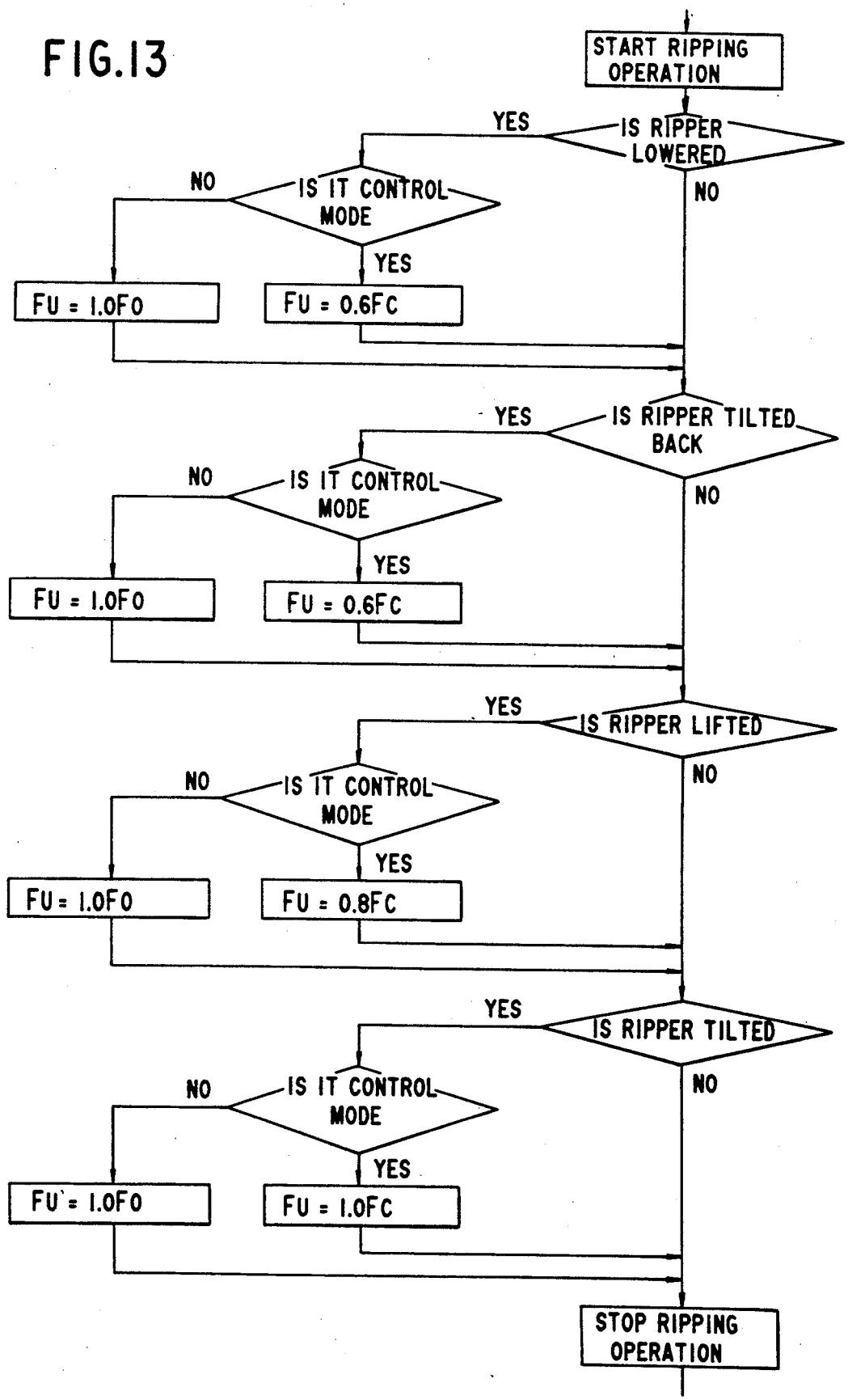
FIG. 13 is a flowchart illustrating all related processing steps required to perform the working operations of the vehicle.

As is clear from a flowchart shown in FIG. 13, operation modes of the engine of the vehicle is closely incorporated with operations of the working equipment or ripper of the vehicle so as to be controlled according to operation of the ripping operation lever of the vehicle.

Incidentally, in the above fourth embodiment of the method of the present invention, the working operation of the vehicle is described as the ripping operation. However, it is also possible to apply the fourth embodiment of the method of the present invention to the other working operations such as bulldozing operations, shoveling operations and the like in the same procedures as those of the flowchart shown in FIG. 13.

Lastly, a fifth embodiment of the method of the present invention will be described with reference to FIGS. 14 and 15.

Figure 14:
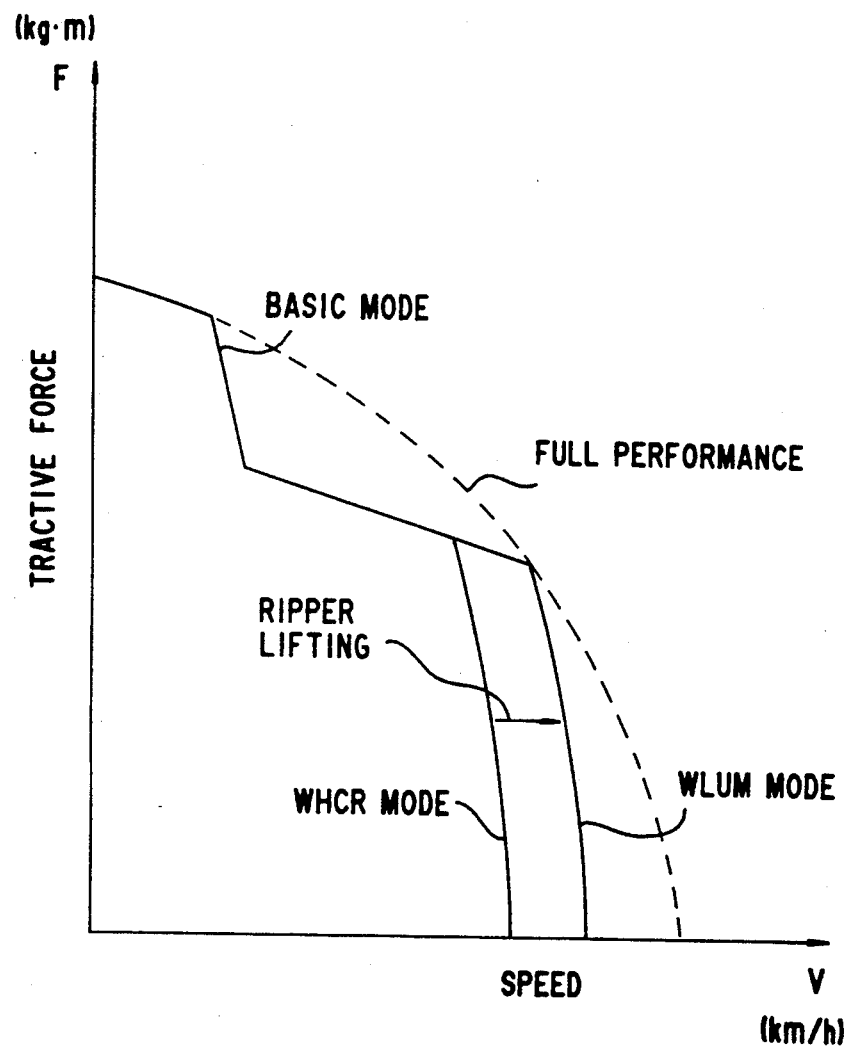
FIG. 14 is a tractive force/speed diagram of the vehicle, illustrating operation of the engine when the vehicle is driven in reverse according to a fifth embodiment of the method of the present invention.

In the fifth embodiment of the method of the present invention, operation of the engine of the vehicle such as a bulldozer is performed in the basic mode as shown in a tractive force/speed diagram of FIG. 14, so that the vehicle or bulldozer is driven forward to perform ripping operations with a shoe slip rate of 30%. In the ripping operations, a tractive force and a steady speed of the vehicle or bulldozer are set at a predetermined value of 70 tons and a predetermined value of 0.7 Km/h, respectively.

According to the fifth embodiment of the method of the present invention, operation of the engine of the vehicle or bulldozer is performed in the basic mode shown in the tractive force/speed diagram of FIG. 14 to enable the vehicle or bulldozer to perform the ripping operations in forward speeds. During the ripping operations, when it is required to drive the vehicle or bulldozer in reverse speeds, a gear-shifting lever of the transmission of the vehicle is shifted to positions of reverse speeds from positions of forward speeds, and, the ripper of the vehicle or bulldozer is lifted. As the ripper moves upward under such circumstances, an engine speed of the engine of the vehicle increases to enable operation of the engine to shift from a $W_{HCR}$ mode is to a $W_{LUM}$ mode as shown in FIG. 14, which $W_{HCR}$ mode is close to the basic mode while the $W_{LUM}$ mode is close to the full performance curve shown in FIG. 14. As a result, the engine speed of the engine becomes higher than that of the engine enabling the vehicle to perform the ripping operation, and the vehicle begins to travel backward at a speed limited by the $W_{LUM}$ mode of operation of the engine. After the vehicle travels backward a required distance, operation of the engine is shifted back to the $W_{HCR}$ mode from the $W_{LUM}$ mode so that the vehicle is moved forward again to start working operations subsequent to the above ripping operation.

Figure 15:
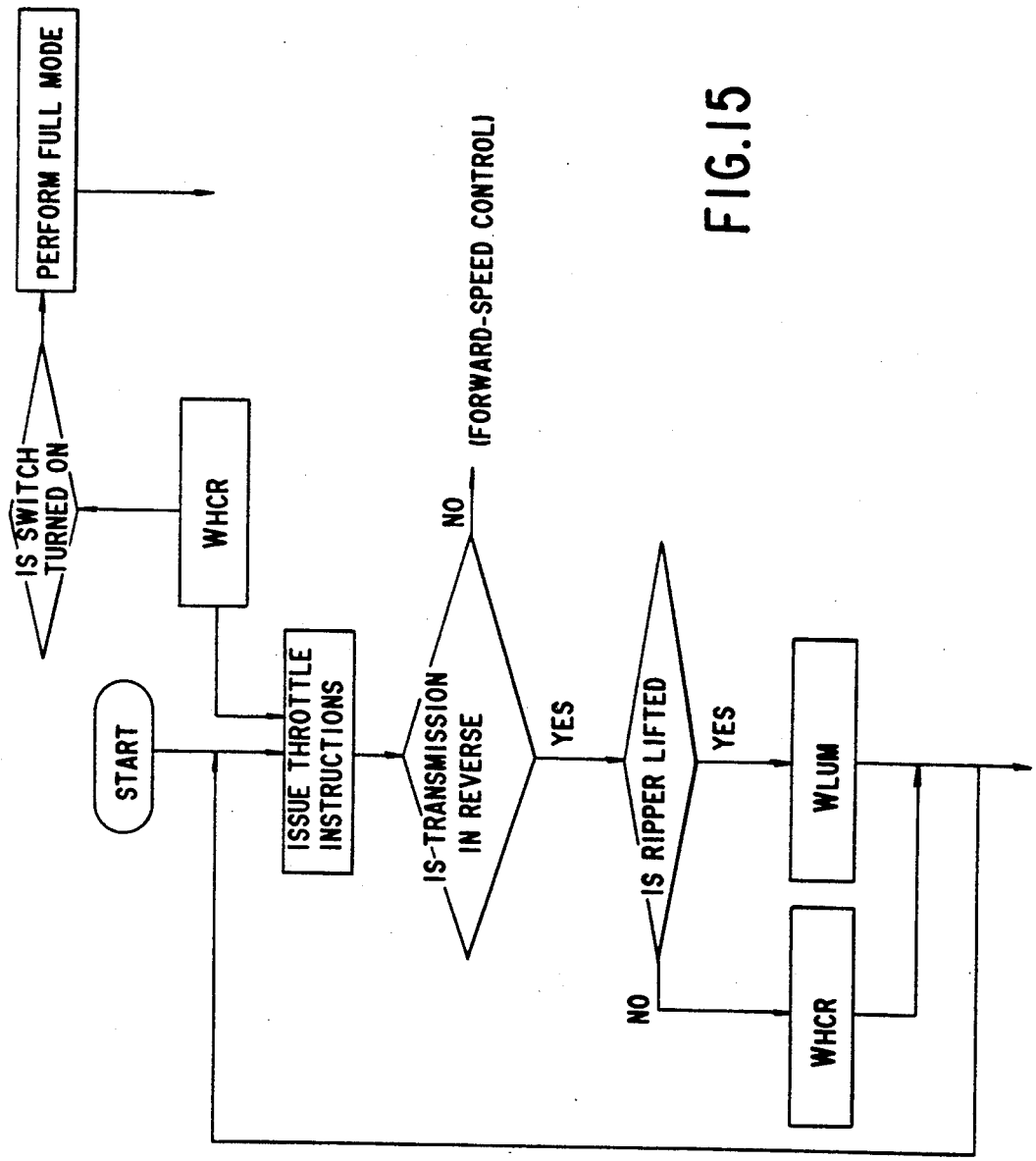
FIG. 15 is a flowchart illustrating all related processing steps required to control operation of the vehicle in reverse speed.

All the above procesures of the fifth embodiment of the method of the present invention are illustrated in a flowchart shown in FIG. 15. Namely, all related processing steps of the flowchart shown in the FIG. 15 are preset in a dial and associated with switches which are operated to control the reverse speeds of the vehicle. In the flowchart shown in FIG. 15 illustrating the fifth embodiment of the method of the present invention, the predetermined values of a tractive force, steady speed and a shoe slip rate are set at 70 tons, 0.7 Km/h and 30%, respectively, as in the fourth embodiment of the method of the present invention. In the fifth embodiment of the method of the present invention illustrated in the flowchart of FIG. 15: an engine speed of the engine of the vehicle in the $W_{HCR}$ mode is about 1600 rpm until the ripper of the vehicle is lifted; and an engine speed of the engine of the vehicle in the $W_{LUM}$ mode is preferably within a range of from about 1800 to about 1900 rpm when the ripper of the vehicle is lifted.

In addition, according to the method of the present invention, by appropriately setting an engine speed of the engine of the vehicle in the $W_{HCR}$ mode and the $W_{LUM}$ mode, it is also possible to control the reverse speeds of the vehicle under the conditions where: the blade of the vehicle or bulldozer is lowered to perform the bulldozing operation; or the blade of the vehicle remains in its lifted position.

We claim:

1. An adaptive engine power output mode setting method based on shoe slip of a crawler vehicle provided with an engine, for performing an effective working operation of said crawler vehicle, comprising the steps of:

presetting said engine with at least one of preset basic operation modes;

storing at least one of said preset basic operation modes of said engine in an engine power output control system of said vehicle, wherein in each of said preset basic operation modes of said engine, a higher power output portion of an engine power output full performance curve shown in a tractive force-travelling speed relationship is cut off beforehand in accordance with conditions of the ground; and selecting an adaptive basic operation mode of said engine out of said preset basic operation modes by operating a dial which is preset in accordance with the conditions of the ground.

2. The adaptive engine power output mode setting method based on said shoe slip of said crawler vehicle as set forth in claim 1, wherein:

a power output of said engine in each of said basic operation modes is partially cut off to provide an operation control mode of said engine, which control mode is stored in said engine, power output control system of said vehicle;

a rate of said shoe slip of said vehicle is constantly measured during working operation of said vehicle; and when said shoe slip rate of said vehicle thus measured exceed a predetermined value, said power output of said engine is partially cut off by gradually shifting an operation mode of said engine from said at least one of present basic operation modes to said operation control mode thereof until said shoe slip of said vehicle is removed.

3. The adaptive engine power output mode setting method based on said shoe slip of said crawler vehicle as set forth in claim 2, wherein:

when said shoe slip rate of said vehicle thus measured decreases to a value lower than said predetermined value, said power output of said engine is recovered by gradually shifting said operation mode of said engine from said at least one of preset operation control modes to said basic operation mode thereof.

4. The adaptive engine power output mode setting method based on said shoe slip of said crawler vehicle as set forth in claim 3, wherein:

when said at least one of preset operation modes of said engine is shifted in one of: (1) from said basic operation mode to said operation control mode, and (2) from said operation control mode to said basic operation mode, variation of said rate of said shoe slip of said vehicle from said predetermined value is measured; and, at the same time, variations in traveling speed and a tractive force of said vehicle from a predetermined traveling speed and a predetermined tractive force are also measured, which variations of said vehicle in shoe slip rate, traveling speed and tractive force are employed as additional conditions for shifting said operation mode of said engine.

5. The adaptive engine power output mode setting method based on said shoe slip of said crawler vehicle as set forth in claim 1, wherein:

when a rate of said shoe slip of said vehicle reaches a predetermined value, a tractive force of said vehicle is stored as a drawbar-pull in said engine power output control system which also provides one of said basic operation modes of said engine;

said drawbar-pull of said vehicle is multiplied by a plurality of preset drawbar-pull coefficients depending on conditions of the ground, to produce a plurality of values corresponding to a plurality of power outputs of said engine, which power outputs have been partially cut off in operation control modes of said engine, which operation control modes are stored in said engine power output control system of said vehicle; and said adaptive basic operation mode of said engine is selected out of said preset basic operation modes by operating said dial which is preset in accordance with the conditions of the ground, so that said power output of said engine is partially cut off in said adaptive basic operation mode of said engine until said rate of said shoe slip of said vehicle reaches said predetermined value.

6. The adaptive engine power output mode setting method based on said shoe slip of said crawler vehicle as set forth in claim 1, wherein said method further comprising the steps of:

storing in said engine power output control system of said vehicle a plurality of full engine speeds which depend on the conditions of the ground to provide a substantially full power output of said engine, said vehicle engine being so operated; as to shift a gear-shifting lever of a transmission of said vehicle from a forward speed position to a reverse speed position of said gear-shifting lever when driven in reverse a; and as to shift an engine speed from that of said adaptive basic operation mode of said engine to one of said full engine speeds providing said substantially full power output of said engine; and setting said engine speed according to conditions of said effective working operation of said vehicle by means of a reverse-traveling speed setting dial of said vehicle, in which dial the plurality of said full engine speeds are preset.

* * * * *